UNITED STATES PATENT OFFICE.

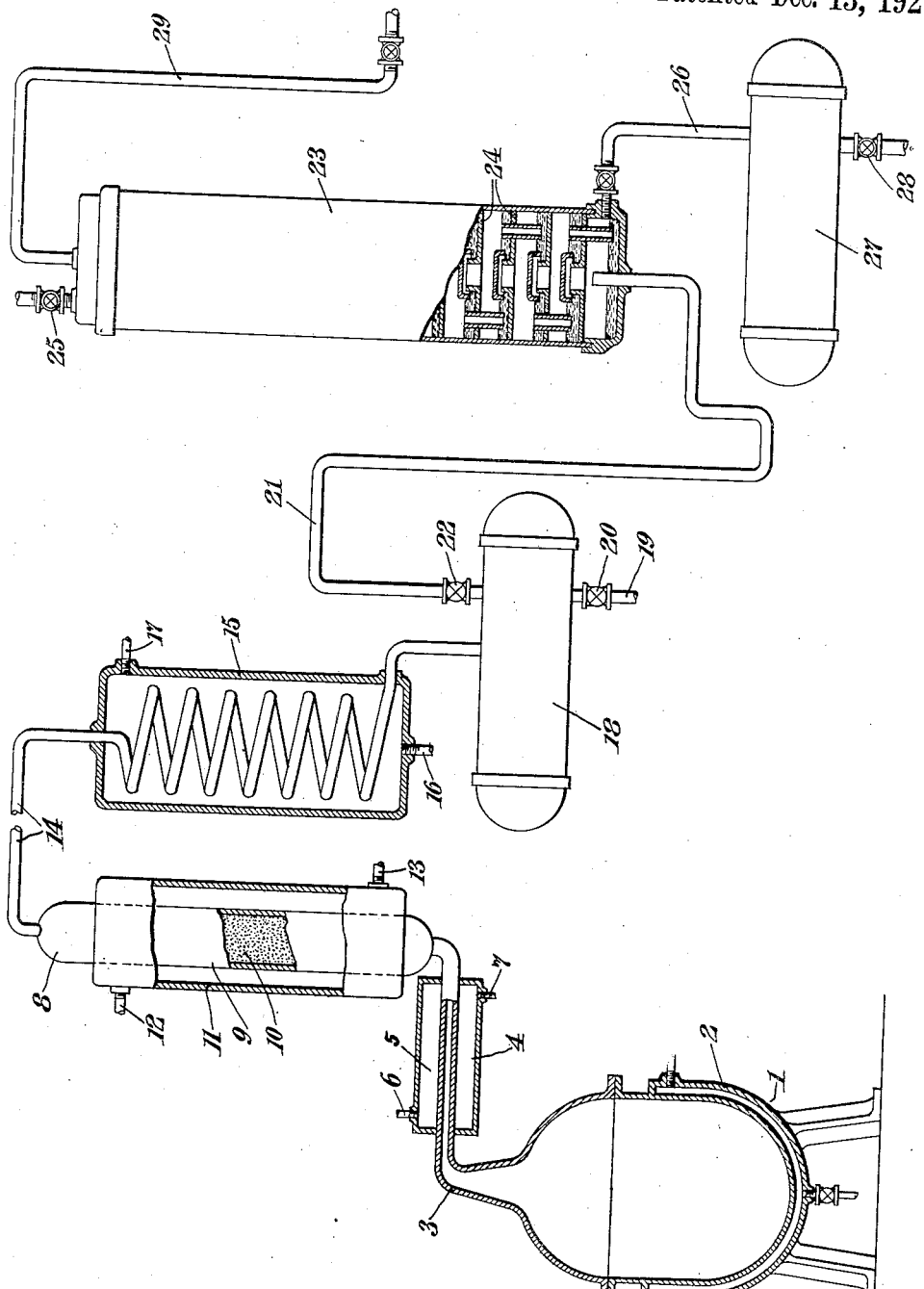

HERMAN F. WILLKIE, OF BALTIMORE, MARYLAND, ASSIGNOR TO U. S. INDUSTRIAL ALCOHOL CO., A CORPORATION OF WEST VIRGINIA.

PROCESS OF MAKING METHYL FORMATE.

1,400,195.                Specification of Letters Patent.        Patented Dec. 13, 1921.

Application filed December 24, 1918. Serial No. 268,189.

*To all whom it may concern:*

Be it known that I, HERMAN F. WILLKIE, of Baltimore, in the State of Maryland, have invented a certain new and useful Improvement in Processes of Making Methyl Formate, and do hereby declare that the following is a full, clear, and exact description thereof.

My invention relates particularly to a process for making methyl formate in an advantageous manner, as for example from methyl alcohol.

The object of my invention is to provide a process for the production of methyl formate in a very simple manner and at a low cost.

A further object of my invention is to provide a process by which methyl formate may be readily made from methyl alcohol. Further objects of my invention will appear from the detailed description thereof contained hereinafter.

While my invention is capable of embodiment in many different forms, for the purpose of illustration I shall describe only one way of carrying out the same hereinafter, and while it is capable of being carried out in connection with many different types of apparatus I have shown only one type of apparatus for use in connection therewith in the accompanying drawings, in which—

The figure is a diagrammatic representation of an apparatus which may be used for carrying out my invention.

In the drawings, I have shown a still 1 for providing vapors of methyl alcohol, adapted to be heated by means of a steam jacket 2, and having a vapor outlet pipe 3, which passes through a preheater 4, adapted to be heated in any suitable way, as for example by an oil jacket 5, having inlet and outlet pipes 6 and 7. The tube 3 is connected, beyond the preheater 4, with a catalyzer 8, which is comprised of a copper tube 9 carrying a quantity of granular porous material 10, such for example as pumice stone, unglazed porcelain, charcoal or terra cotta having distributed throughout the same particles of a finely-divided catalyzer metal, such for example as copper, nickel, chromium or iron, which may be deposited therein by any suitable means, but preferably in such a manner as to involve the reduction of an oxid of the metal by a current of hydrogen, as for example in accordance with the process of making catalyzers set forth in application Serial No. 240,221, filed June 15, 1918, by Arthur A. Backhaus. Said catalyzer 8 is provided with any suitable heating means, but may, for example, be provided for this purpose with a heating jacket 11, having inlet and outlet pipes 12 and 13, respectively, for applying a highly heated current of oil thereto. A tube 14 leads from the upper portion of the catalyzer 8 to a condenser 15, which is provided with the usual inlet and outlet pipes for cooling water 16 and 17, and which is adapted to condense the vapors of methyl alcohol which pass out of the catalyzer 8, as well as some of the methyl formate which is formed by the action of the catalyzer thereon. The condensed vapors of methyl alcohol and methyl formate are caught in a cylindrical receiver 18, and may be drawn off therefrom by a pipe 19, having a valve 20 therein, while the uncondensed vapors and gases, comprising principally methyl formate and hydrogen, pass out by pipe 21, containing a valve 22, to a scrubbing tower or column 23. The vapors in the tower 23 pass through a series of liquid-sealed pans 24, constructed in the same manner in which scrubbing towers or columns are ordinarily made, in which pans a current of absorbing liquid is caused to flow in the opposite direction from an inlet pipe 25 located at the top of the tower. The absorbing liquid may be water or methyl alcohol. In this way, a solution of methyl formate in water or methyl alcohol, having a strength of 35%, may be obtained, and will flow out of the tower 23 by means of an outlet pipe 26, and thence into a receiver 27, from which it may be drawn off by an outlet pipe 28, and may be collected in any suitable manner.

In the operation of my invention, a quantity of methyl alcohol may be introduced into a still 1 and is distilled therein by means of heat applied, as by the steam jacket 2. The methyl alcohol vapors may be thence conveyed away by the pipe 3 to the preheater 4, where the vapors may be heated to a temperature of between 350° and 450° F., but preferably to a temperature of approximately 400° F., before they enter the catalyzer 8, which is the temperature preferred for the action of the catalyzer material upon the methyl alcohol vapors. These vapors, therefore, enter the catalyzer 8 at the required temperature, so that the formation of methyl formate therein immediately begins as soon as the vapors reach the catalyzer material within the tube 9. The oil jacket 11 or the like maintains the vapors in the tube 9 at a temperature of from 350° to 450° F., but preferably at about 400° F., throughout the entire length of said tube, and as a result of the action of the catalyzer material a large percentage of the methyl alcohol vapors are changed into methyl formate and hydrogen.

The vapors passing out of the catalyzer 8 by means of the tube 14 may be conducted through the condenser 15, which is maintained at a temperature of from 20° to 30° C., where any methyl alcohol vapors present are condensed and collected in the receiver 18, together with some of the methyl formate formed by the action of the catalyzer. The condensate may be drawn off by means of the pipe 19.

The condensate thus obtained may be subjected to fractional distillation, if desired, to separate the methyl formate from the methyl alcohol.

The residual methyl formate and vapors and the hydrogen pass out of the receiver 18 and may be conducted to the scrubbing tower or column 23, where the ascending vapors of methyl formate and hydrogen may be subjected to a counter-current of an obsorbing liquid, such as water or methyl alcohol, by passing through the series of liquid-sealed pans 24 therein until substantially all of the methyl formate has become absorbed in the liquid. The liquid thus obtained may pass out of the tower 23 by means of the pipe 26 to the receiver 27. This may comprise a solution of water or methyl alcohol containing 35% of methyl formate. This solution may be subjected to fractional distillation to recover the methyl formate, if desired.

The hydrogen may pass away at the top of the tower 23 by means of the pipe 29 and may be collected therefrom in any suitable manner.

While I have described my invention above in detail, I wish it to be understood that many changes may be made therein without departing from the spirit of the same.

I claim:

1. The process which comprises subjecting methyl alcohol to the action of a metallic catalyst so as to form methyl formate, the catalytic action taking place at a temperature lying between about 350 and about 450 degrees F.

2. The process which comprises subjecting methyl alcohol to the action of a copper catalyst so as to form methyl formate, the catalytic action taking place at a temperature lying between about 350 and about 450 degrees F.

3. The process which comprises subjecting vapors of methyl alcohol to the action of a metallic catalyst so as to form methyl formate and then condensing out from the vapors methyl alcohol and methyl formate, the catalytic action taking place at a temperature lying between about 350 and about 450 degrees F.

4. The process which comprises subjecting vapors of methyl alcohol to the action of a copper catalyst so as to form methyl formate and then condensing out from the vapors methyl alcohol and methyl formate, the catalytic action taking place at a temperature lying between about 350 and about 450 degrees F.

5. The process which comprises subjecting vapors of methyl alcohol to the action of a metallic catalyst so as to form methyl formate then condensing out from the vapors methyl alcohol and methyl formate, and then passing the residual vapors of methyl formate and hydrogen to an absorbing tower so as to recover a solution of the remaining methyl formate, the catalytic action taking place at a temperature lying between about 350 and about 450 degrees F.

6. The process which comprises subjecting vapors of methyl alcohol to the action of a copper catalyst so as to form methyl formate, then condensing out from the vapors methyl alcohol and methyl formate, and then passing the residual vapors of methyl formate and hydrogen to an absorbing tower so as to recover a solution of the remaining methyl formate, the catalytic action taking place at a temperature lying between about 350 and about 450 degrees F.

7. The process which comprises subjecting vapors of methyl alcohol to the action of a metallic catalyst so as to form methyl formate, then condensing out from the vapors methyl alcohol and methyl formate, then passing the residual vapors of methyl formate and hydrogen to an absorbing tower so as to recover a solution of the remaining methyl formate, and then separating the methyl formate from its solutions by fractional distillation, the catalytic action taking place at a temperature lying between about 350 and about 450 degrees F.

8. The process which comprises subjecting vapors of methyl alcohol to the action of a copper catalyst so as to form methyl formate, then condensing out from the vapors methyl alcohol and methyl formate, then passing the residual vapors of methyl formate and hydrogen to an absorbing tower so as to recover a solution of the remaining methyl formate, and then separating the methyl formate from its solutions by fracplace at a temperature lying between about 350 and about 450 degrees F.

9. The process which comprises subjecting methyl alcohol to the action of a metallic catalyst so as to form methyl formate, the methyl alcohol having first been preheated to the reaction temperature, ranging from between 350 to 450 degrees F.

10. The process which comprises subjecting methyl alcohol to the action of a copper catalyst so as to form methyl formate, the methyl alcohol having first been preheated to the reaction temperature, ranging from between 350 to 450 degrees F.

In testimony that I claim the foregoing I have hereunto set my hand.

HERMAN F. WILLKIE.

Witnesses:
RAY M. CARTER,
WILLIAM WATSON.